Feb. 17, 1953 W. B. LOWE ET AL 2,628,407
THREAD-ADVANCING REEL
Filed Aug. 19, 1949 2 SHEETS—SHEET 1
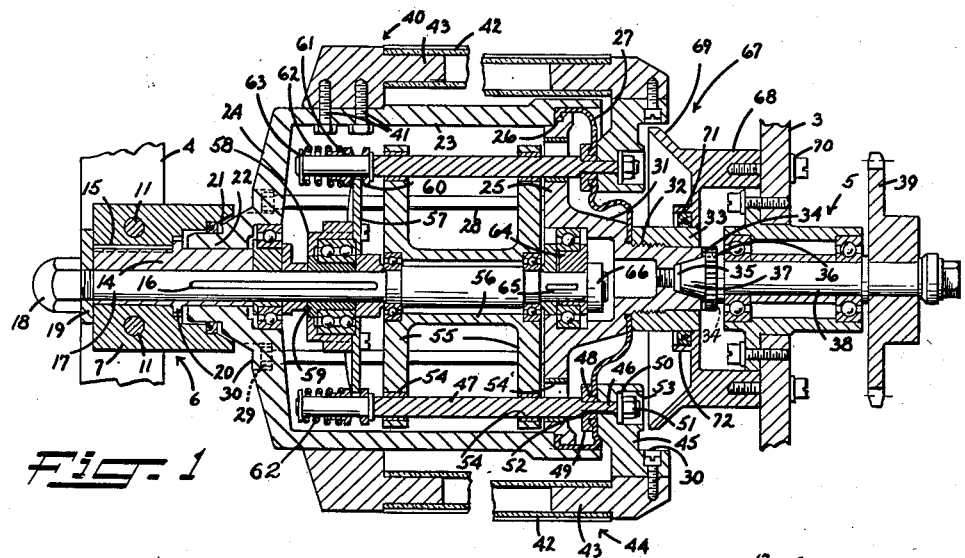
Fig. 1
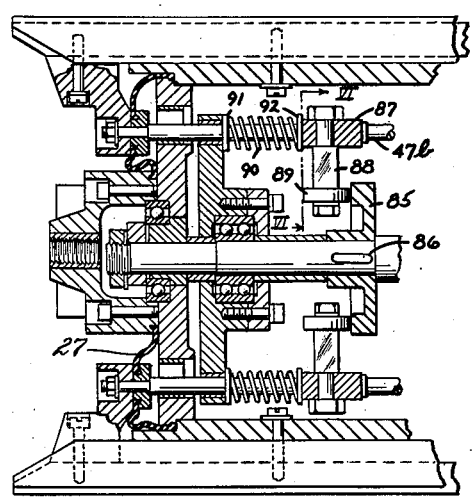
Fig. 5
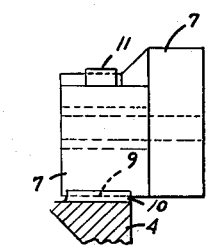
Fig. 1a
Fig. 1b
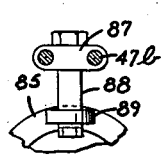
Fig. 6
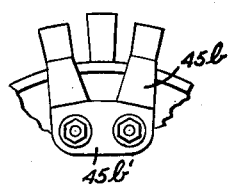
Fig. 7
INVENTORS.
WILLIAM B. LOWE
HARRY E. PAPE
BY Thomas R. O'Nally
ATTORNEY.

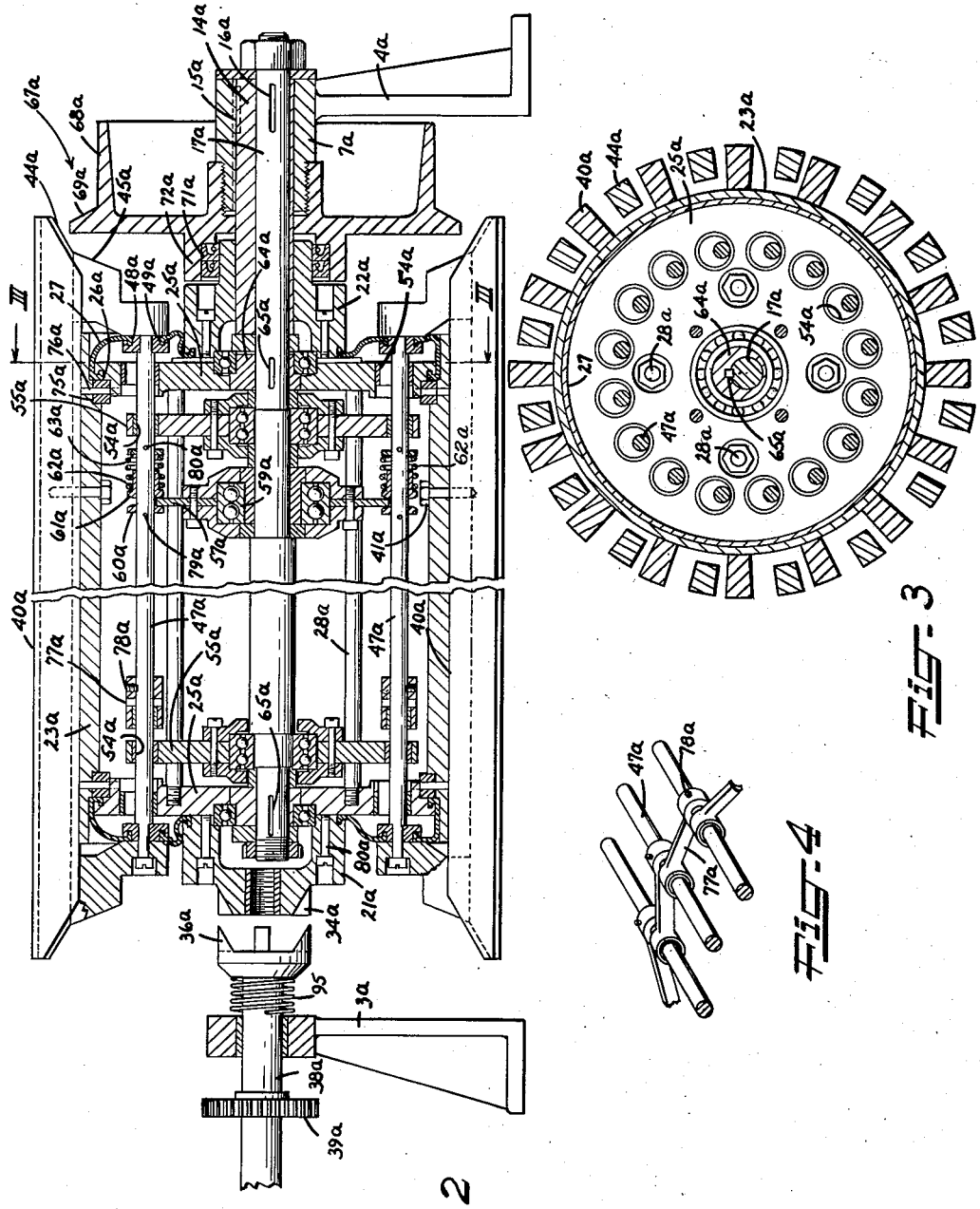

Patented Feb. 17, 1953

2,628,407

UNITED STATES PATENT OFFICE

2,628,407

THREAD-ADVANCING REEL

William B. Lowe, Springhaven, and Harry E. Pape, Norwood, Pa., assignors to American Viscose Corporation, Wilmington, Del., a corporation of Delaware Application August 19, 1949, Serial No. 111,139

13 Claims. (Cl. 28—71.6)

This invention relates to thread-advancing reels and particularly to reels of this type which are protectively sealed against the entrance of liquids into the bearings and driving connections during the liquid treatment of yarns as they proceed in a helical path over the bars of the reel.

It is an object of the invention to provide a construction of thread-advancing reels which is adequately protected against corrosion but avoids the necessity for incorporation of long cylindrical, flexible boots of rubber or like material which are not only expensive to manufacture but have a greater proportion of the area thereof exposed where it is subject to damage by piercing and other mechanical action, as well as by corroding influences. It is a further object of the invention to provide a thread-advancing reel comprising two cage-like sets of inter-digitating bars in which the construction of each reel member as well as the reel as a whole is characterized by rigidity and positive and uniform thread-advancing action even on reels of long axial length. Other objects and advantages of the invention will be apparent from the drawing and the description thereof hereinafter.

In the drawing, which is illustrative of the invention, Figure 1 is a longitudinal sectional view through one embodiment of the invention, Figure 1a is an end view of one of the bearings for the reel of Figure 1, Figure 1b is a side view of the bearing of Figure 1a, Figure 2 is a similar sectional view through a modification, Figure 3 is a transverse section on line III—III of Figure 2, Figure 4 is a pictorial view of a detail, Figure 5 is a longitudinal section through a modification of the embodiment of Figures 2-4, Figure 6 is a section taken on line VI—VI of Figure 5, and Figure 7 is an end view of one of the movable bar units showing its disposition relative to the other reel bars.

In general, the reel comprises a frame member, such as a fixed shaft, upon which the reel members or cages are rotatably mounted. One reel member is a rigid member, that is the bars which are spaced circumferentially about the periphery of such member are held together in fixed relationship by a rigid structure. The other reel member comprises a plurality of circumferentially spaced bars which when mounted in the reel assembly alternate with the bars of the rigid member. The second member may be called the actuatable member since it comprises bars which are mounted for axial reciprocation during the rotation of the reel member when in operation. The bars of the actuatable member have outer thread supporting peripheral surfaces which are disposed in a cylinder and the reel member as a whole rotates about the axis of this cylinder. The axis of the actuatable reel member is offset from, though parallel to, the axis of rotation of the rigid reel member so that during rotation of the reel members, the periphery of the bars of one set intercepts the periphery of the bars of the other set. During rotation of the reel, the turns of thread are transferred from the rigid reel member to the actuatable reel member repeatedly and while the turns are carried by the bars of the actuatable member, these bars are slid forwardly to advance the thread toward the discharge end of the reel. When the bars of the actuatable member recede within the periphery of the bars of the rigid member, the actuatable bars are shifted back in preparation for the next forward stroke.

More specifically, the rigid reel member of the present invention comprises a cylindrical outer shell upon which and surrounding which the circumferentially spaced thread-carrying bars are fixedly supported. The shell is carried by spaced supporting members in the form of webs, plates, or the like located radially within the shell. One such web is provided adjacent or at each end of the shell and, if desired, in a long reel additional intermediate webs may be provided for reinforcing the span of the shell.

The actuatable reel member comprises at least two axially spaced radially extending supporting elements, such as discs, spiders, webs, or the like which are rotatably mounted on the fixed shaft. Each of the radially extending supporting elements is provided with a plurality of guideways extending therethrough in a direction parallel to the shaft and means is provided for rigidly connecting these supporting elements so that their corresponding guideways are in alignment. The actuatable bars have inwardly extending projections at their ends and a rod parallel to the bar is secured to the projection or projections of each such bar. Such rods extend through the corresponding guideways of one or all of the supporting members. Means is provided between the supporting members for reciprocating the rods at the proper portion of the reel periphery during each cycle of revolution. Means is also provided for interconnecting the actuatable rods to prevent relative rotation therebetween while permitting relative reciprocation.

The rods referred to extend through at least one of the supporting members of the rigid reel member and sealing means is provided adjacent and outside each member that is penetrated by the rods. One of the end supporting members for the rigid reel member may or may not be pierced by the rods. When it is not, it may be made entirely solid so that it serves to close that end of the reel and no flexible sealing member is needed at this end in such a case.

Referring more particularly to Figure 1, there is shown two fixed frame members 3 and 4 which carry the end bearings 5 and 6 respectively for the thread-advancing reel. As shown in the end view (Fig. 1a) and the side elevation (Fig. 1b), the bearing 6 comprises a bearing block 7 which has a bottom tongue 8 which slidably fits within a groove 9 in the upwardly extending boss 10 of the frame member 4. Two cap screws 11 extend through bores in the block 7 as shown in Figures 1, 1a, and 1b and are secured in the frame 4. The bearing block 7 is keyed to a bushing 14 by means of key 15. The bushing 14 is keyed to the shaft 17 by means of key 16. Shaft 17 extends into the reel and is secured in fixed relationship by means of a nut 18 which is threaded upon the end of the shaft and bears against a washer 19 and clamps block 7 against the shoulder 20 formed on the bushing 14. This assembly permits easy demounting of the reel by removal of screws 11. A change of eccentricity can be had by providing a plurality of keyways 13.

A flexible sealing ring 21 of rubber or suitable corrosion resistant synthetic rubber is disposed in an annular chamber formed between an overhanging cup-like extension of the block 7 and the hub 22 of the rigid reel member which comprises the cylindrical shell 23 and the inwardly extending supporting member in the form of a web or flange 24 terminating in the hub 22. The other end of the shell 23 receives a supporting member or web 25 which is recessed at 26 about its outer periphery to receive the flexible sealing membrane 27, such as of rubber or synthetic rubber. A plurality of tie rods 28 secure the end web 25 to the end web 24 and the heads 29 of the tie rods are preferably recessed in the web 24 so that they may be protected by calking as at 30. The web 25 has a hub portion 31 which extends through a central opening in the flexible membrane 27 and is threaded at 32 to receive a clamping bushing or nut 33 for making a tight joint with the inner periphery of the sealing membrane. The outer end of the hub 31 is provided with clutch teeth 34 and a tapered recess 35. The teeth 34 are engaged by the outwardly extending teeth 36 on a clutch member having a tapered projection 37 adapted to cooperate with the recess 35 to smoothly guide the clutch members into engaged position. The clutch member is provided on the end of a shaft 38 rotatably mounted within the bearing member 5 and driven by suitable means such as the gear 39 fixed thereon.

The rigid reel member carries a plurality of bars 40 on its outer periphery, such bars being rigidly secured at one end to the shell 23 as by the cap screws 41. Each bar may be of integral construction or composite, that is it may be made of a single mass of material, suitably corrosion resistant, or it may comprises an outer sleeve 42 cemented, pressed, or otherwise fitted upon the axial extension 43. The sleeve 42 may be of glass, stainless steel, phenol-aldehyde resins, or the like which is durable and free of abrading action on threads to be handled, whereas the remainder of the bar structure may be of any suitable corrosion resistant material such as phenol-aldehyde resins or other material regardless of its action on the threads. Similarly, the supporting structure of the rigid reel member comprising the shell 23, web 24, and hub 22 may be of any suitable corrosion resistant material such as phenol-aldehyde resins or other material regardless of its action on the threads.

The actuatable reel member comprises bars 44 which may be of construction similar to that of bars 40, either integral (i. e. of one mass of material), or provided with a sleeve such as 42 on a projection 43. However, the bars 44 at their ends are each provided with an inwardly projecting extension 45 which is slotted at 46 and receives a reduced section portion of a square-sectioned rod 47. The rod 47 extends through openings 48 in the flexible sealing membrane and suitable clamping washers 49 and 50 are provided to make a tight joint between the extension 45 and the sealing membrane. For this purpose, the washer 49 is recessed and receives in the recess the beaded edge of the membrane at the opening therethrough. A nut 51 serves to clamp the washers together and acts against a shoulder 52 on the rod 47. The extensions 45 may be recessed at 53 to receive the nuts 51 so that the recesses may be calked to protect the nuts from corrosion.

The rods 47 extend through the transverse openings 54 of the supporting discs or webs 55 and loosely through openings 54' in the supporting member 25 of the rigid reel member. The discs 55 are secured together with corresponding openings 54 in alignment so that the rods extending therethrough are at all times parallel. This interconnection between the discs 55 is actually shown in the form of a sleeve or barrel 56 at the inner periphery thereof and the resulting spool-like structure is mounted rotatably on the shaft 17.

Means is provided within the space between the outer supporting webs 24 and 25 for imparting reciprocation to the rods 47. This means comprises a skew plate 57 having a hub 58 rotatably mounted on a sleeve 59 which is keyed by 16 to the shaft 17. The skew plate 57 bears against a collar or washer 60 provided on each of the rods 57 and a second collar 61 is urged against the other face of the skew plate by a spring 62 bearing against a washer 63, held in place on the end of each rod by a suitable cotter key. The faces of collars 60 and 61 are preferably rounded where they engage the skew plate. The skew plate 57 is inclined from the plane at right angles to the axis of shaft 17 by virtue of the inclination of the axis of the outer surface of the sleeve 59 which serves as the bearing support for the skew plate assembly. It will be noted that the direction of inclination is in a plane at right angles to the direction of offset of the axis of shaft 38 from the axis of shaft 17. The offset between shafts 17 and 38 is effected by providing the eccentric bushing 14 and the eccentric bushing 64 at the opposite ends of shaft 17. Bushing 64 is keyed as at 65 to shaft 17 and held in place by means of a nut 66 and the rigid reel member is rotated about an axis corresponding to the axis of the eccentrics 14 and 64, whereas the actuatable reel member rotates about an axis coincident with the axis of shaft 17.

A doffing ring 67 comprising a cylindrical portion 68 and a flared portion 69 which has its larger end extending in proximity to the discharge end of the reel is fastened to the frame member 3 by suitable cap screws 70 and a flexible shell 71 as of rubber or the like is provided between the sleeve 33 and the annular projection 72.

In operation, shaft 38 drives the rigid reel member through the clutch teeth 34 and 36. The rods 47 are carried or pushed around by the inside surfaces of openings 54' in the rigid reel member. During rotation, the reel bars 44 alternately project and recede with respect to the periphery of reel bars 40 by virtue of their eccentric axes. When bars 44 protrude they are shifted to the right in Fig. 1 under the action of the skew plate 57 and when they are retracted within the periphery of bars 40, they are returned to the left. This motion results in a progressive advance of the thread through a helical path over the reel.

As shown in Figures 2 to 4, the reel construction is modified to adapt it to a long reel in which it is necessary to support both ends of each bar in order to provide the necessary rigidity. In this embodiment, the fixed shaft 17a is keyed at 16a to an eccentric bushing 14a which is in turn keyed at 15a within the bearing block 7a of the frame member 4a. A frame member 3a on the other side of the reel structure is adapted to receive a reciprocable driving shaft 38a provided with a clutch member having teeth 36a and a gear 39a by which it may be driven. Any other suitable driving means may be provided at this end of the reel.

The reel comprises a rigid reel member as in the previous embodiment and this rigid reel member comprises two supporting members or webs 25a which are rotatably mounted by suitable antifriction bearings on eccentric sleeves 64a which are keyed to the shaft 17a by keys 65a. The rigid reel member also comprises the cylindrical sleeve 23a which is secured at each end to the webs 25a by a joint comprising an annular ring 75a fitting in suitable recesses in the sleeve and webs respectively and provided with bores into which pins 76a are forced. These pins extend through bores in the sleeve and in the web as well so as to rigidly connect the end webs to the cylindrical shell. The webs 25a are recessed at 26a to receive the beaded edge of the flexible sealing membrane 27 provided at each end of the reel. Tie rods 28a secure the end webs 25a together. Rigid bars 40a are secured directly to the shell 23a as by cap screws 41a.

The actuatable reel member comprises a plurality of bars 44a having extensions 45a which project inwardly from each end thereof and between the inner ends of which rods 47a extend. Whereas in the previous embodiment, the corresponding rods 47 were square-sectioned in order to prevent their rotation within the supporting webs 24 and 25, in the present embodiment, the rods 47a are round and means is provided for preventing rotation of such rods about their own axes, which means comprises a plurality of links 77a inter-connecting each rod with one other rod. A link connects each adjacent two rods 47a as shown in Figure 4. A set screw or tapered pin 78a fixes the link with respect to one of the rods but the adjacent rod is permitted to reciprocate and rotate within the terminal sleeve of the link. By providing such a link between adjacent rods of the entire set and fixing one end of the link to one of the rods while leaving the other end free to reciprocate and rotate, the entire set of rods is prevented from rotating about their own axes. Every other link may be omitted if the remaining links are fixedly secured at each end to the two rods each link embraces. This linkage can also be used in the embodiment of Figure 1 if the rods 47 therein are made of round cross-section.

The rods 47a pass through the bushings 54a in bores in the supporting elements or webs 55a, the hubs of which are rotatably mounted upon the shaft 17a. The same type of means is provided for reciprocating the rods 47a as is used in the reel structure of Figure 1 and comprises the skew plate 57a, the collars 60a and 61a, the latter of which is urged against the skew plate by spring 62a bearing against the washer 63a. The assembly of collars and washers may be confined between two cotter pins 79a and 80a extending through the rod 47a. The skew plate is mounted upon the outer surface of bushing 59a, which surface has an axis inclined with respect to that of the shaft 17a in a plane at right angles to the direction of offset of the axis of shaft 38a from the axis of shaft 17a. The flexible sealing membranes 27 are provided with openings 48a to permit the ends of rods 47a to extend therethrough and a washer 49a may be provided adjacent each end of each rod to form a tight joint with the beaded edge of the flexible membrane where the rod goes through it. The outer faces of webs 25a are provided with extensions 21a and 22a which serve as hubs. These extensions are secured to the webs 25a by means of the cap screws 80a and their outer peripheries at the juncture with the webs are recessed to receive the beaded edge along central openings within the flexible membranes 27 for the purpose of making a tight sealing joint therewith. The hub 21a is provided with an extension in the form of a clutch member having clutch teeth 34a adapted to be engaged by the teeth 36a of an axially shiftable coupling member carried on the inside end of shaft 38a which is normally urged into clutch-engaging position by a spring 95.

At the discharge end of the reel, a fixed doffing ring 67a is fixed, as by threading, on the bearing 7a and comprises a cylindrical portion 68a and a tapered portion 69a, the latter portion being overhung by the discharge end of the bars of the reel. The doffing ring 67a comprises an inwardly projecting flange 72a and one or more flexible seals 71a are provided within the annular space between 72a and an outwardly projecting portion of the hub 22a.

While the skew plate assembly comprising 57a etc. is disposed between the webs 55a in this embodiment, it may also be disposed between one of such webs and the adjacent web 25a, in which event, the webs 55a may be interconnected by tie rods or a cylindrical sleeve or barrel as in the case of the embodiment of Figure 1.

In operation, shaft 38a drives the rigid reel member through the clutch teeth 34a and 36a. The rods 47a are carried or pushed around by the inside surfaces of openings 54a' in the rigid reel member. During rotation, the reel bars 44a alternately project and recede with respect to the periphery of reel bars 40a by virtue of their eccentric axes. When bars 44a protrude they are shifted to the right in Figure 2 under the action of the skew plate 57a and when they are retracted within the periphery of bars 40a, they are returned to the left. This motion results in a progressive advance of the thread through a helical path over the reel.

Figures 5–7 show a reel of a construction which is the same as that of the reel in Figures 2–4 except for (1) the replacement of the skew driving plate with a cam 85 which is keyed at 86 to the shaft; (2) the rods 47b are coupled in pairs so that they may be of round cross-section and the links 77a are not necessary to prevent rotation of the bars on their own axes. The modified portion of the structure is more specifically described as follows: The rods 47b are paired together by yokes 87 to each of which there is secured an inwardly projecting stub shaft 88 carrying a follower roller 89 which is engaged by the cam surface of 85. A spring 90 may encircle each of the rods and extends between collars 91 and 92 so as to urge the follower 89 against the cam surface at all times. As shown in Figure 7, the inwardly extending projections 45b are made in the form of a U-shaped yoke so as to couple two bars to the corresponding rods by the base of the yoke 45b'. The inwardly extending projection 45b could connect each individual bar separately to one of the rods as in the embodiment of Figures 2–4 but in such event, the rods should be keyed within the yoke 87 to prevent relative rotation.

As in the previous embodiments, the exposed parts of the reel may be made of corrosion resistant materials which do not always have the strength characteristics required of driving members except when made of extremely massive and heavy construction. By the present construction of reel, however, the drive and bearing members can be made of materials regardless of corrosion resistance and thereby they can be made of a smaller size to facilitate the construction of a compact and durable reel. Thus, in this embodiment, it is only necessary to employ corrosion resistant materials for the thread carrying bars, the extensions 45a, the flexible seals, the cylindrical shell 23a, the hubs 21a and 22a, and the doffing ring 67a. The other parts are protected within the seals and flexible membranes and can be made of materials having good structural characteristics from the standpoint of strength and wear-resistance without regard to corrosion.

It is to be understood that changes and variations may be made without departing from the spirit and scope of the invention as defined in the appended claims.

We claim:

1. A thread-advancing reel comprising a set of fixed bars, a set of movable bars interdigitating with the fixed bars, means for imparting relative motion between the two sets of bars, the movable bars each having an inwardly extending projection from an end thereof, rods secured to the projections and extending parallel to the corresponding bars within the space encompassed by the set of bars, a shaft, means for supporting the rods comprising two axially spaced radially extending elements rotatably mounted on the shaft, said elements having aligned openings slidably receiving the rods and having an inside contour corresponding in size and shape to the outside contour of the rods, means for preventing rotation of the rods on their own axes, and means mounted on the shaft for reciprocating the rods relative to the elements.

2. A thread-advancing reel comprising a shaft, a rigid reel member rotatably mounted on the axis of the shaft, said member having a cylindrical shell and circumferentially spaced bars rigidly secured thereto and spaced supporting members extending inwardly of the shell adjacent the ends thereof, a second reel member rotatably mounted on an axis offset from that of the rigid member and comprising a plurality of movable bars alternately disposed with respect to the bars of the rigid member, each of the movable bars having an inwardly extending projection, rods secured to the projections and extending loosely through apertures in at least one of the supporting members, means for supporting the rods comprising two axially spaced radially extending elements rotatably mounted on the axis of the shaft between the supporting members secured to the shell, said elements having aligned openings slidably receiving the rods and having an inside contour corresponding in size and shape to the outside contour of the rods, means for preventing rotation of the rods on their own axes, and means mounted on the shaft between the supporting members for reciprocating the rods relative to the elements.

3. A thread-advancing reel comprising a fixed shaft, a rigid reel member rotatably mounted on the shaft having a cylindrical shell and circumferentially spaced bars rigidly secured thereto, spaced supporting members inside the shell and secured rigidly thereto adjacent the ends thereof, hubs on said supporting members, a second reel member rotatably mounted on the shaft on an axis offset from that of the rigid member and comprising a plurality of movable bars alternately disposed with respect to the bars of the rigid member, each of the movable bars having an inwardly extending projection, rods secured to the projections and extending loosely through apertures in at least one of the supporting members, means for supporting the rods comprising two axially spaced radially extending elements rotatably mounted on the shaft between the supporting members secured to the shell, said elements having aligned openings slidably receiving the rods and having an inside contour corresponding in size and shape to the outside contour of the rods, means for preventing rotation of the rods on their own axes, means mounted on the shaft between the supporting members for reciprocating the rods, and a flexible sealing membrane adjacent and outside of each supporting member through which the rods extend and being secured at its outer periphery between the shell and such supporting member, at its inner periphery to the hub of such supporting member, and having openings therein through which the rods extend and to the peripheries of which openings the rods are tightly clamped.

4. A reel as defined in claim 3 in which the supporting elements are rigidly interconnected by an integral sleeve extending therebetween.

5. A reel as defined in claim 3 in which the bars of each set are of cantilever construction.

6. A reel as defined in claim 3 in which the bars of each set are of cantilever construction and those of one set are supported at one end of the reel while those of the other set are supported at the opposite end.

7. A reel as defined in claim 3 in which the means for reciprocating the rods comprises a skew plate fixed on the shaft and projections on the rods for engaging the skew plate.

8. A reel as defined in claim 3 in which the contours of the rods and of the openings in the elements are non-circular.

9. A reel as defined in claim 3 in which the means for preventing rotation of the rods on their own axes comprises a plurality of links interconnecting each rod with at least one other rod, each link being fixedly secured to a separate rod and being pivotally connected to another rod.

10. A reel as defined in claim 3 in which the actuatable bars have inwardly extending projections at both ends, the rods are secured at both ends between the projections and extend through and ride against apertures in both supporting members, and a flexible sealing membrane is provided at both ends of the reel outside of the end supporting members.

11. A reel as defined in claim 10 in which the bars of the rigid reel member have inner surfaces the full length of the shell bearing directly against, and fixed upon, the shell.

12. A reel as defined in claim 10 in which the means for preventing rotation of the rods on their own axes comprises a plurality of links interconnecting each rod with at least one other rod, each link being fixedly secured to a separate rod and being pivotally connected to another rod.

13. A thread-advancing reel comprising a fixed shaft, a rigid reel member rotatably mounted on the shaft having a cylindrical shell and circumferentially spaced bars rigidly secured thereto, spaced supporting members inside the shell and secured rigidly thereto adjacent the ends thereof, hubs on said supporting members, a second reel member rotatably mounted on the shaft on an axis offset from that of the rigid member and comprising a plurality of movable bars alternately disposed with respect to the bars of the rigid member, each of the movable bars having an inwardly extending projection, rods secured to the projections and extending loosely through apertures in at least one of the supporting members, means for supporting the rods comprising two axially spaced radially extending elements rotatably mounted on the shaft between the supporting members secured to the shell, an integral sleeve extending between and rigidly interconnecting the supporting elements, said elements having aligned openings slidably receiving the rods and having an inside contour corresponding in size and shape to the outside contour of the rods, means for preventing rotation of the rods on their own axes, means mounted on the shaft between the supporting members for reciprocating the rods, and a flexible sealing membrane adjacent and outside of each supporting member through which the rods extend and being secured at its outer periphery between the shell and such supporting member, at its inner periphery to the hub of such supporting member, and having openings therein through which the rods extend and to the peripheries of which openings the rods are tightly clamped.

WILLIAM B. LOWE.
HARRY E. PAPE.

REFERENCES CITED

The following references are of record in the file of this patent:

UNITED STATES PATENTS

| Number | Name | Date |
| --- | --- | --- |
| 2,255,017 | Torrence et al. | Sept. 2, 1941 |
| 2,404,005 | Stanley et al. | July 16, 1946 |
| 2,414,644 | Gram | Jan. 21, 1947 |
| 2,461,576 | Stanley | Feb. 15, 1949 |